US011233417B2

United States Patent
Xiongbin

(10) Patent No.: US 11,233,417 B2
(45) Date of Patent: Jan. 25, 2022

(54) RECHARGEABLE CHARGER FOR RECHARGEABLE DEVICES, AND METHOD FOR CHARGING RECHARGEABLE DEVICES

(71) Applicant: Sennheiser electronic GmbH & Co. KG, Wedemark (DE)

(72) Inventor: Xu Xiongbin, Singapore (SG)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 31 days.

(21) Appl. No.: 16/732,521

(22) Filed: Jan. 2, 2020

(65) Prior Publication Data

US 2021/0210967 A1    Jul. 8, 2021

(51) Int. Cl.
   *H01M 10/44*  (2006.01)
   *H01M 10/46*  (2006.01)
   *H02J 7/00*   (2006.01)

(52) U.S. Cl.
   CPC ........ *H02J 7/0071* (2020.01); *H02J 7/00032* (2020.01); *H02J 7/0044* (2013.01); *H02J 7/0048* (2020.01)

(58) Field of Classification Search
   CPC .... H02J 7/00032; H02J 7/0044; H02J 7/0042; H02J 7/0048; H02J 7/0071
   USPC ........ 320/107, 111, 114, 132, 133, 137, 149, 320/160
   See application file for complete search history.

(56) References Cited

U.S. PATENT DOCUMENTS

| 5,497,067 A | 3/1996 | Shaw |
| 9,502,913 B2 | 11/2016 | Castillo et al. |
| 2017/0288420 A1 | 10/2017 | Johnson et al. |
| 2019/0207402 A1* | 7/2019 | Renken ................. H02J 7/0086 |

FOREIGN PATENT DOCUMENTS

WO    WO 2017/205575    11/2017

OTHER PUBLICATIONS

Notification of Transmittal of The International Search Report and The Written Opinion of The International Searching Authority, or The Declaration for Application No. PCT/EP2020/086620 dated Mar. 9, 2021.
Written Opinion of The International Searching Authority for Application No. PCT/EP2020/086620 dated Mar. 9, 2021.

\* cited by examiner

*Primary Examiner* — Edward Tso
(74) *Attorney, Agent, or Firm* — Haug Partners LLP

(57) ABSTRACT

A rechargeable charger that includes a rechargeable battery and charging control circuitry for controlling a charging of at least one portable rechargeable device. The charging control circuitry is configured such that charging is automatically and periodically interrupted after reaching a charged state. During a charging phase energy is transferred from the rechargeable battery to the portable rechargeable device via interface circuitry until gauging circuitry indicates that a threshold value has been reached upon which a pause phase is entered where charging of the portable rechargeable device from the rechargeable battery is suspended. In the pause phase a timer is started, and when the timer has elapsed, the charging phase is started again. As a result, phases of charging the portable rechargeable device and phases of switching off the charging alternate.

17 Claims, 3 Drawing Sheets

RECHARGEABLE CHARGER FOR RECHARGEABLE DEVICES, AND METHOD FOR CHARGING RECHARGEABLE DEVICES

The present invention relates to a rechargeable charger for rechargeable devices and to a method for charging rechargeable devices.

BACKGROUND

It is noted that citation or identification of any document in this application is not an admission that such document is available as prior art to the present invention.

Rechargeable mobile electronic devices are widely used. Recently, rechargeable wireless earphones or earbuds have become popular that comprise a radio receiver for receiving audio data, an amplifier and a transducer for reproducing the audio data and a rechargeable battery for supplying power to the radio receiver, the amplifier and the transducer. Various types of charging cases for charging the wireless earphones are known.

For example, U.S. Pat. No. 9,502,913 B2 discloses a transport and/or storage container for rechargeable wireless earphones that has an integrated charging function and a rechargeable battery. When the wireless earphones are inserted, they (i.e., their rechargeable batteries) may be charged using energy from the container's rechargeable battery unit when the container is not coupled to an electrical energy source. On the other hand, both the wireless earphones and the container's rechargeable battery unit are charged when the container is coupled to an electrical energy source. The container's rechargeable battery unit has a much higher storage capacity than the wireless earphones' rechargeable batteries, so that the wireless earphones may be recharged several times without connecting the container to an electrical energy source, before the container's rechargeable battery unit needs to be recharged. Commonly, the wireless earphones are charged as soon and as long as they are placed in the container.

Generally, it is desirable to achieve a long recharging cycle or standby time, that is, a long time between a charging and the next recharging being required. This applies to both, the wireless earphones' rechargeable batteries and the container's rechargeable battery unit. However, since the container is also for transport and/or storage, users tend to put their wireless earphones into the container whenever they do not wear them. As batteries always have a certain degree of self-discharge, common charging devices either provide a float voltage to the wireless earphones' rechargeable batteries for keeping them in the fully charged state, or the charging device continuously monitors the voltage of the wireless earphones' rechargeable batteries and initiates some re-charging as soon as the charging state decreases. In both cases energy is drawn from the container's rechargeable battery unit for performing the respective procedure. Although only a small amount of energy is lost by performing these procedures, it still is notably more energy than the energy that is lost by self-discharge. Sometimes the wireless earphones are left in the container for days or weeks. In this case, there is a high risk of both the wireless earphones' rechargeable batteries and the container's rechargeable battery unit running empty.

SUMMARY

An object of the present invention is to provide an improved method for recharging portable rechargeable devices. A further object of the present principles is to provide a portable rechargeable container for portable rechargeable wireless earphones that has an extended recharging cycle, and thus provides an extended standby-time.

While conventionally the wireless earphones are recharged as soon and as long as they are placed in the container, it has been recognized that the rechargeable battery of the container is discharged slower if the rechargeable battery of the container and the rechargeable batteries of the wireless earphones are separate, compared to a case where they are continuously connected to each other for charging. The invention is based on the recognition of the fact that it is advantageous to switch off the recharging of the wireless earphones as soon as they are charged to a certain level.

In principle, the above-mentioned object is achieved by charging a portable rechargeable device, such as an earphone, from a portable charging device that has a rechargeable battery, whereby the charging is periodically interrupted after reaching a charged state. The interruption is an automatic electrical interruption. Thus, phases of charging the portable rechargeable device and phases of switching off the charging alternate. A phase of switching off or interrupting the charging of the portable rechargeable device is also referred to as pause phase in the following. A phase of charging the portable rechargeable device is referred to as charging phase. Charging phases are considerably shorter than pause phases. For example, a charging phase takes a few minutes while the pause phase takes several hours.

The duration of the charging phase may depend on a current charging level (i.e., filling level) of the portable device to be charged, while the duration of the pause phase may be a predefined time. Optionally, the duration of the charging phase may be limited to a predefined maximum time, e.g. one hour. If after the maximum time the charging level of the portable rechargeable device has not reached a predefined minimum value, the portable rechargeable device may be assumed to be defective and may be disconnected from the charger in order to protect the charger.

In one aspect, both the charging phase and the pause phase are terminated when the portable rechargeable device is physically disconnected from the charger, e.g. removed from the container. A new charging phase may begin when the portable rechargeable device is physically connected to the charger, e.g. inserted in the container.

In one embodiment, the invention relates to a method for recharging a portable rechargeable device from a portable charging device having a rechargeable battery.

In another embodiment, the invention relates to a rechargeable charging device, such as a container, that comprises a rechargeable battery and charging control circuitry for controlling the charging of portable rechargeable and preferably wireless devices such as earphones, which may be inserted into the container.

The invention has the advantage that the stand-by time of the charger's rechargeable battery is extended, so that the charger can have a longer recharging interval (i.e., a longer time before the charger needs to be recharged). Another advantage is that also the stand-by time of the rechargeable battery of the portable rechargeable device is extended. In other words, the portable rechargeable device can be left in the container, or connected to the charger respectively, longer than with conventional solutions, and it will still be charged.

Further advantageous embodiments are disclosed in the figures and the detailed description below.

BRIEF DESCRIPTION OF THE DRAWINGS

Details and further advantageous embodiments of the present invention may be better understood by reference to the accompanying drawings, which show in FIG. 1 a block diagram of a rechargeable charger for earbuds and a rechargeable earbud.

DETAILED DESCRIPTION OF PREFERRED EMBODIMENTS

Figure 1:
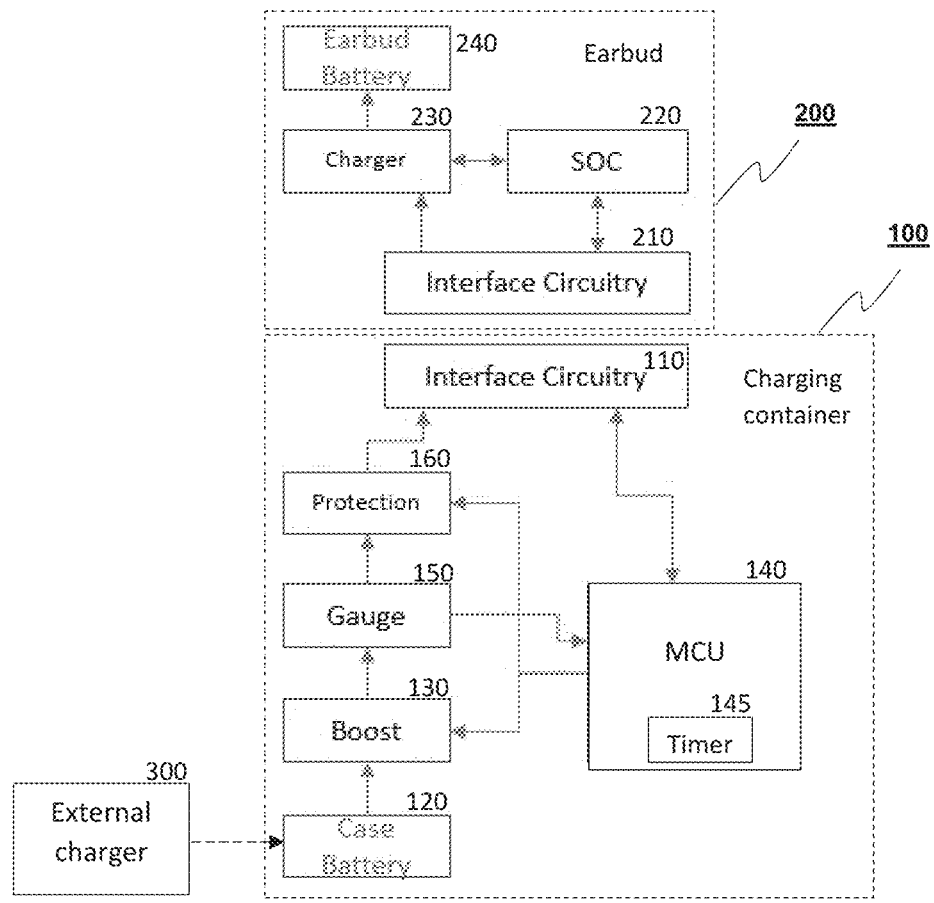

FIG. 1 shows a block diagram of a rechargeable charging device 100 for earbuds and a rechargeable earbud 200 connected to the charging device. The rechargeable charging device or charger 100 may be a container that is suitable for inserting and charging two earbuds. Generally, the rechargeable charging device 100 may be adapted for any type of portable rechargeable device, not only earbuds. The charger 100 comprises a rechargeable battery 120 and charging control circuitry 130-160 for controlling the charging of portable rechargeable and preferably wireless devices such as earphones. The charging control circuitry as depicted comprises boost circuitry 130, a main control unit MCU 140, a timer 145, gauging circuitry 150 and protection circuitry 160. The main control unit MCU 140 comprises at least a processor and optionally the timer 145. Further, the charger 100 comprises an interface with interface circuitry 110. The MCU and interface circuitry 110 may implement a sensor that is adapted for detecting that a portable rechargeable device 200 has been connected to (or inserted in) the charger 100. The rechargeable battery 120 of the charger 100 may be recharged by an external charger 300 that e.g. may be connected to the mains, as usual. Optionally the energy from the external charger 300 is transmitted to the charger 100 in a contactless way, e.g. by inductive or capacitive coupling.

The portable rechargeable device 200 has a rechargeable battery 240, a processor SOC 220, charging circuitry 230 and an interface with interface circuitry 210 that matches the charger's interface. The rechargeable battery 240 of the portable rechargeable device 200 is connected via the boost circuitry 130, the gauging circuitry 150, the protection circuitry 160, interfaces 110,210 and the charging circuitry 230 to the rechargeable battery 120 of the rechargeable container. Thus, the portable rechargeable device 200 can be charged from power of the rechargeable battery 120.

While the portable rechargeable device 200 is being charged, the gauging circuitry 150 automatically detects a battery charging level of the portable rechargeable device 200 and compares it to a threshold value. As long as the detected battery charging level has not reached the threshold value, the charging of the portable rechargeable device 200 continues. If the gauging circuitry detects that the battery charging level has reached the threshold value, the portable rechargeable device is electrically disconnected from the rechargeable battery, so that the charging is disrupted. At that time, the timer 145 in the charging device 100 is automatically started. When the timer 145 elapses, the portable rechargeable device 200 is electrically reconnected to the rechargeable battery 120 of the charger, so as to charge the portable rechargeable device 200. Since the power consumption of the portable rechargeable device 200 is well predictable as long as it remains in the charger or connected to the charger, the timer 145 may be adjusted to a given duration during which the filling level of the rechargeable battery 240 usually does not fall below a given standby threshold level. The given duration may e.g. be 10-12 hours.

In an embodiment, the boost circuitry 130 draws power from the case battery 120 and produces charging voltage for the earbud 200. It is controlled by the MCU 140. The gauging circuitry 150 is in principle a sensor for monitoring the charging current to estimate the earbud battery status. The protection circuitry 160 may protect the arrangement under high current and prevent reversal current, which would discharge the portable rechargeable device 200. Within the portable rechargeable device 200, there is a processor 220 and charging circuitry 230 for charging the battery 240. The charging circuitry 230 works automatically and may be configured by the processor 220.

If the charger is a charging container, it may comprise a sensor for detecting that a portable device such as a wireless earphone has been inserted into the container for recharging. The charging control circuitry as described above recharges the wireless earphone (i.e., the rechargeable battery within the wireless earphone) while the gauging circuitry gauges the filling of the wireless earphone. E.g., the interface circuitry 110,210 may inform the charger 100 that earbuds 200 are inside, and/or it may inform the earbuds 200 that the charger 100 is working properly.

The gauging circuitry 150 automatically detects a battery charging level of the connected portable rechargeable device 200, compares the detected battery charging level to a threshold value and detects if the threshold value has been reached. The main control unit (MCU) 140 is connected at least to the interface circuitry 110 and the gauging circuitry 150, as depicted in FIG. 1.

Upon insertion of the portable rechargeable device 200 into the charging container 100, the MCU 140 is adapted for controlling the charger 100 to repetitively perform the following: First, a charging phase is performed until the MCU 140 receives a signal from the gauging circuitry 150 indicating that the threshold value has been reached. Upon this signal, a pause phase is entered and the MCU 140 electrically disconnects the portable rechargeable device 200 from the rechargeable battery 120, so that the charging of the portable rechargeable device is interrupted, and starts the timer 145. No action is taken until the timer has elapsed. When the timer 145 has elapsed, the portable rechargeable device 200 is electrically reconnected to the rechargeable battery 120, so that the portable rechargeable device 200 is charged again. During the charging, the gauging circuitry 150 operates as described above. This procedure may be repeated as long as the portable rechargeable device 200 is connected to the charger 100. It may be independent from the charger 100 itself being charged via the external charger 300. Alternatively, the charger 100 may switch from a pause phase into a charging phase when the charger 100 is connected to the external charger 300. In an embodiment, the timer duration may depend on the charging level of the charger's battery 120. E.g., the timer duration may increase when the charging level of the charger's battery 120 lowers.

Figure 2:
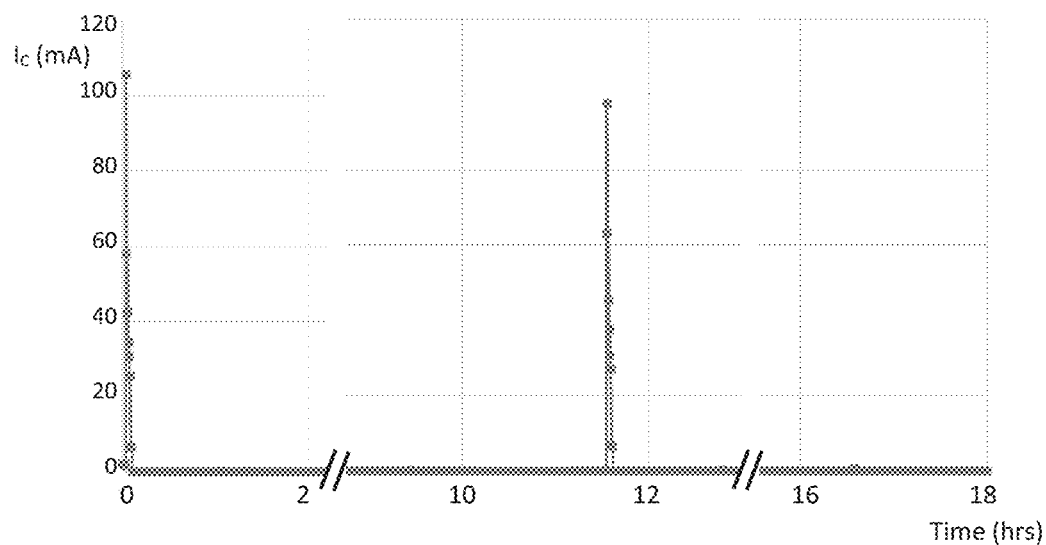
FIG. 2 a long-term charging diagram.

FIG. 2 shows in a long-term charging diagram charging current $I_C$ drawn from the charger's battery 120 over time. As depicted, a charging current slightly over 100 mA is drawn over a short time at the time 0 and again around 11.5 hours later. In the meantime, practically no current is drawn from the charger's battery 120. E.g. the boost circuitry 130, gauge circuitry 150, protection circuitry 160 and/or interface circuitry 110,210 do not consume any power during this time. Also, the processor 220 and the charging circuitry 230 within the portable device to be charged may be switched off, so that they do not consume power. The cycle time, which is 11.5 hours in this example, may ensure that the filling level of the rechargeable device 200 always remains above a given standby threshold, e.g. at least 95%. The cycle time may be increased if the standby threshold is lowered, e.g. to 48 hours for a filling level of at least 80% or 6 hours for a filling level of at least 97.5% (depending on the types of rechargeable batteries actually used).

Figure 3:
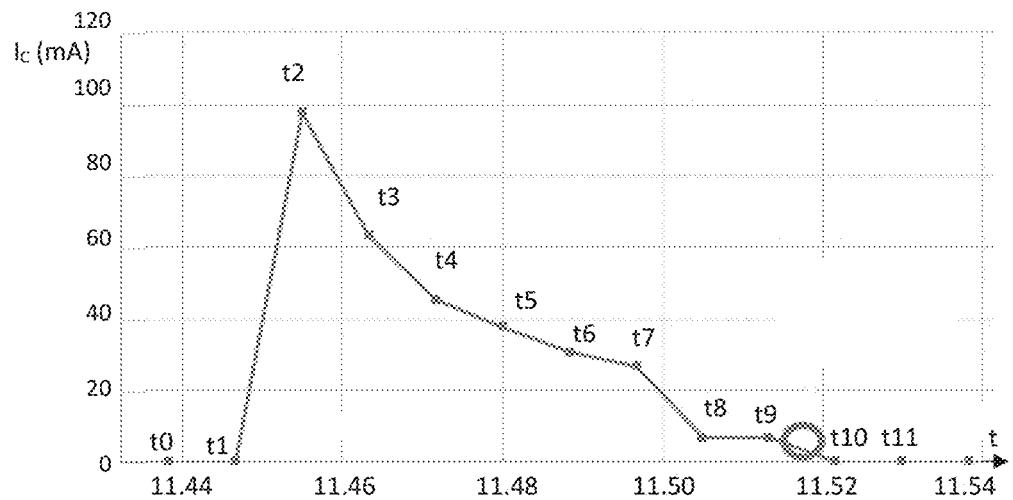
FIG. 3 a charging diagram of a charging phase.

FIG. 3 shows in a charging diagram details of the charging phase of FIG. 2. When the timer awakes at t1, the charging current $I_C$ ramps up quickly until t2. From then, the charging current drops continuously while the charging level of the rechargeable battery 240 increases. Between t9 and t10, the gauging circuitry 150 detects that the charging current dropped below a minimum value, so that the rechargeable battery 240 can be considered as fully charged. In response, the MCU 140 enters the pause phase by controlling the boost circuitry 130 to finish charging, i.e. switch off the charging voltage, and starting again the timer 145 for another 11.5 hours. The pause phase needs not have any particular exact duration, but is considerably longer than the charging phase, as has become clear from the above. Here is an improvement over conventional solutions, since the usual continuous charging current, even if it is very low, is inefficient.

When the portable rechargeable device 200 is disconnected from the charger 100, the cycle may terminate. When it is reconnected to the charger 100 (e.g. re-inserted into the charging case), the charging cycle as shown in FIG. 2 may begin newly. Depending on a current charging level of the portable rechargeable device 200, the active phase may be shorter or longer.

Figure 4:
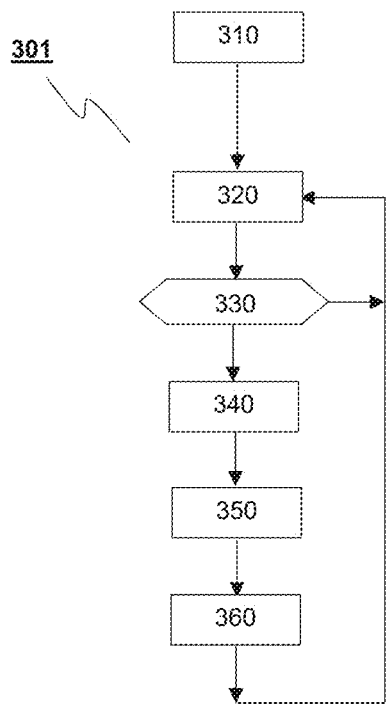
FIG. 4 a flow-chart of a method.

FIG. 4 shows a flow-chart of a method for recharging a portable rechargeable device 200 from a portable charging device 100 having a rechargeable battery 120. The method 301 comprises detecting 310 that the portable rechargeable device has been connected to the portable charging device, and upon the detecting, repetitively performing the following: first, the portable rechargeable device is electrically connected to the rechargeable battery 120 of the charger so that it is charged 320 from power of the rechargeable battery. Meanwhile, a battery charging level of the portable rechargeable device is automatically detected 330 and compared to a threshold. While the detected battery charging level has not reached a predefined threshold value, the charging 320 continues. When the detected battery charging level has reached the threshold value in 330, the portable rechargeable device is electrically disconnected 340 from the rechargeable battery so that the charging is disrupted, and a timer 145 is started 350 that may be in the portable charging device 100, in an embodiment. When the timer elapsed, the portable rechargeable device 200 is electrically reconnected 360 to the rechargeable battery 120 so as to charge the portable rechargeable device again 320. The procedure is terminated whenever the portable rechargeable device 200 is removed or physically disconnected from the charger 100.

In another embodiment, the timer 145 may be in the device 200 to be charged or in a further device external to the charger 100 and communicatively coupled to the charger 100.

In the above-described embodiment, the timer value (i.e. the pause duration) is constant and determined in a way that the earbud battery usually does not drop below a certain limit, e.g. 90%. In other embodiments, the timer value can also be determined by calculating from gauge data obtained previously from the gauging circuitry 150. E.g., the MCU 140 may receive gauge data from the gauging circuitry 150 and program the timer 145 correspondingly. Then, the MCU 140 may determine a timer value from the gauge data and adjust the timer according to the timer value during the charging phase. In this way, the charger 100 may individually adopt to various different devices to be charged. E.g. if the charging phase took relatively long at a relatively low current, this may mean that the rechargeable battery 240 of the device 200 to be charged is weak, so that the pause phase may be reduced so as to be shorter than usual. Generally, the total current-time product (so-called coulomb) can be measured during the charging phase and can be used to determine the duration of the next pause phase. Also, other parameters may be considered. In one embodiment, the rechargeable device 200 to be charged provides type identification information to the MCU 140, e.g. via interfaces 210,110. The MCU 140 can set the timer duration according to the type identification information.

When the rechargeable charging device 100 is connected to an external charger 300 the energy loss for providing a float voltage or for constant re-charging may be tolerated. In one embodiment of the invention the rechargeable charging device 100 may therefore omit entering a pause phase as long as it is connected to an external charger 300.

Both, the rechargeable charger 100 and the device to be charged 200 may initiate specific action upon the event that the device to be charged is inserted into the charger or removed from the charger. The rechargeable charger 100 may enter a charging phase upon insertion and the device to be charged 200 may deactivate some of its functions upon insertion and activate some of its functions upon removal. Therefor detection means are needed for detecting whether the device is connected to the charger or not. In common charging devices, this detection can be done by observing a voltage at a charging pin that is used for transferring energy from the charger battery to the device to be charged. But this common way of detection may fail for an embodiment of the invention when the rechargeable charger 100 enters a pause phase: In a pause phase, explicitly no voltage is applied to a charging pin and therefore observing a voltage at this pin won't be good enough to detect a state of insertion.

In one embodiment of the invention, the rechargeable charger 100, or the device to be charged 200, or both may therefore feature specific connection sensing means for detecting whether the device to be charged 200 is connected to the rechargeable charger 100 or not. Those connection sensing means may include a sensor or a connection pin or means for transferring data. The connection sensing means are configured to detect whether the device to be charged 200 is connected to the rechargeable charger 100 regardless of whether the rechargeable charger 100 is currently in a pause phase or not. Specifically, the rechargeable charger 100 may comprise connection sensing means that enable the rechargeable charger 100 to detect whether the device to be charged 200 is connected to the rechargeable charger 100 in a pause phase as well as in a charging phase. Equivalently, the device to be charged 200 may comprise connection sensing means that enable the device to be charged 200 to detect whether the device to be charged 200 is connected to the rechargeable charger 100 in a pause phase as well as in a charging phase. Preferably, the power consumption of the connection sensing means is significantly lower than the energy that is lost for permanent recharging. An example for connection sensing means that fulfil these requirements is shown in FIG. 5.

Figure 5:
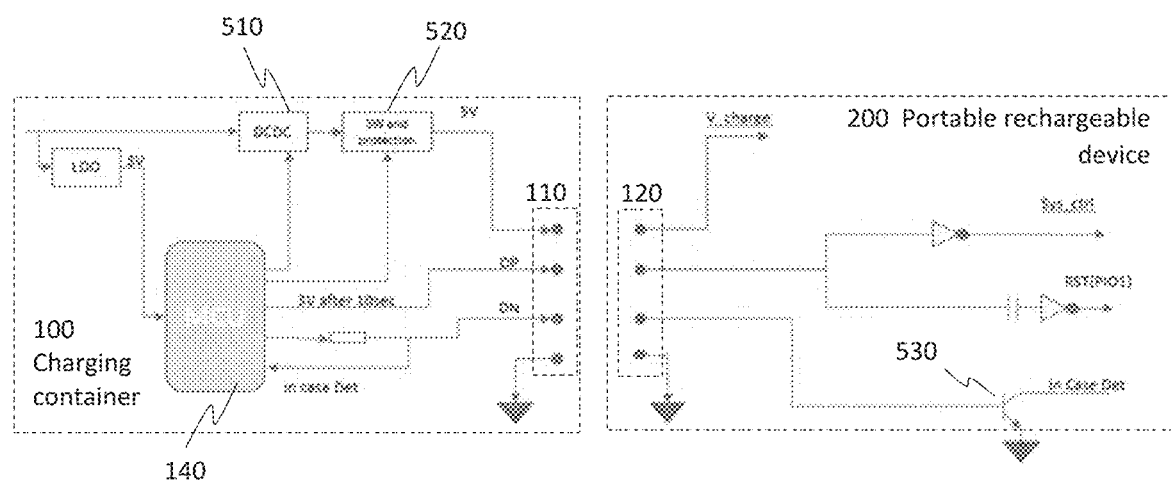
FIG. 5 a partial block diagram of a rechargeable charger and a device to be charged.

FIG. 5 shows a partial block diagram of a rechargeable charger and a device to be charged, in an exemplary embodiment. In this example, charger 100 is a charging container and the MCU 140 detects continuously whether or not the portable rechargeable device 200 is inserted in the charging container 100. The detection uses a transistor 530 that is within the portable rechargeable device 200 and that is connected to the MCU via a pin DN of the interfaces 110,120. The MCU simply measures the electric potential of the DN pin. If the portable rechargeable device 200 is inserted, the potential is lower than otherwise. This arrangement has at least two advantages: first, it has a very low power consumption, so that it is usable for continuous detection. Second, the portable device 200 may detect at the collector of the transistor 530 whether or not it is within the charging container 100. If the device 200 detects to be within the charging container 100, some functions (e.g. transmitting, receiving, music playback etc.) may be disabled. Exemplarily, the charging container 100 comprises a DC/DC converter 510, which may be part of the above-described boost circuitry 130, and a switching and protection block 520 comprising a switch and the above-described gauging circuitry 150 and protection circuitry 160. The MCU 140 provides a control voltage on interface pin DP that indicates to the portable device 200 whether the charger 100 is in a charging phase or pause phase. During pause phases, the portable device 200 may switch off some circuitry (not shown in FIG. 5) so as to avoid any power consumption.

By observing the voltage at the pin DN at the interface 110, 210, both the charger 100 and the portable rechargeable device 200 can detect whether the portable rechargeable device 200 is connected to the charger 100 or not, independently from being in a charging phase or a pause phase. Via the pin DP at the interface 110, 210, the charger 100 may further transmit the information about being in a charging phase or in a pause phase to the portable rechargeable device 200 and the portable rechargeable device 200 may take associated action, like entering or terminating a sleeping mode.

The invention is particularly advantageous for earbud chargers. However, while the above description refers to rechargeable containers for rechargeable wireless earphones, it is clear that it may also apply to rechargeable containers for other rechargeable appliances, in particular for mobile/wearable devices.

While various different embodiments have been described, it is clear that combinations of features of different embodiments may be possible, even if not mentioned herein. Such combinations are considered to be within the scope of the present invention.

The invention claimed is:

1. A portable charging device for charging portable rechargeable electronic devices, the portable charging device comprising:
a rechargeable battery; and
charging control circuitry for controlling a charging of at least one portable rechargeable device, comprising:
interface circuitry adapted for electrically connecting the at least one portable rechargeable device to the rechargeable battery, so as to charge the at least one portable rechargeable device from power of the rechargeable battery;
gauging circuitry adapted for:
automatically detecting a battery charging level of the connected at least one portable rechargeable device,
comparing the detected battery charging level to a threshold value, and
detecting if the threshold value has been reached; and
a processor configured for serving as a control unit connected at least to the interface circuitry and the gauging circuitry, the control unit comprising a timer,
wherein the charging control circuitry is adapted for repetitively:
performing a charging phase by transferring energy from the rechargeable battery to the at least one portable rechargeable device via the interface circuitry until the gauging circuitry indicates that the threshold value has been reached;
entering a pause phase where the charging of the at least one portable rechargeable device from the rechargeable battery is suspended, and starting the timer; and
when the timer has elapsed, returning to the charging phase.

2. The portable charging device of claim 1, wherein the timer is configured to elapse after more than one hour.

3. The portable charging device of claim 1, wherein the timer is configured to elapse after more than ten hours.

4. The portable charging device of claim 1, wherein the gauging circuitry is adapted for measuring a charging current for automatically detecting the battery charging level of the connected at least one portable rechargeable device, and wherein the threshold value is a predefined charging current.

5. The portable charging device of claim 1, further comprising boost circuitry, wherein the rechargeable battery and the at least one portable rechargeable device are connected via the boost circuitry, and wherein the control unit is adapted for controlling the boost circuitry to electrically disconnect the at least one portable rechargeable device from the rechargeable battery and/or to electrically reconnect the at least one portable rechargeable device to the rechargeable battery.

6. The portable charging device of claim 5, wherein the electrically disconnecting the portable rechargeable device from the rechargeable battery comprises the control unit controlling the boost circuitry to switch off a charging voltage, wherein the at least one portable rechargeable device comprises second charging circuitry for detecting the switched off charging voltage.

7. The portable charging device of claim 1, wherein the control unit is adapted for detecting that the at least one portable rechargeable device has been connected to or inserted in the portable charging device, and for thereupon starting the charging phase.

8. A method for charging a portable rechargeable device from a portable charging device, the portable charging device having a first rechargeable battery and the portable rechargeable device having a second rechargeable battery, the method comprising:
detecting that the portable rechargeable device has been connected to the portable charging device;
upon the detecting, repetitively performing the following steps:
charging the second rechargeable battery of the portable rechargeable device from power of the first rechargeable battery;
during charging, automatically detecting a battery charging level of the second rechargeable battery and comparing it to a threshold value;

while the detected battery charging level has not reached the threshold value, continuing the charging of the second rechargeable battery; and if the detected battery charging level has reached the threshold value, performing the steps of:
electrically disconnecting the portable rechargeable device from the first rechargeable battery such that the charging is disrupted;
starting a timer in the portable charging device; and
when the timer elapses, electrically reconnecting the portable rechargeable device to the first rechargeable battery so as to charge the second rechargeable battery.

9. The method of claim 8, wherein the timer elapses after more than one hour.

10. The method of claim 8, wherein the timer elapses after more than ten hours.

11. The method of claim 8, wherein the battery charging level of the second rechargeable battery is detected by gauging circuitry measuring a charging current, and wherein the threshold value is a predefined charging current.

12. The method of claim 8, further comprising, during the charging, determining a timer value and adjusting the timer according to the timer value.

13. The method of claim 12, wherein the timer value is determined based on a charging current measured by the gauging circuitry.

14. The method of claim 8, wherein the steps of automatically detecting the battery charging level of the second rechargeable battery of the portable rechargeable device and comparing the detected battery charging level to the threshold value are performed continuously until the threshold is reached.

15. The method of claim 8, wherein the steps of automatically detecting the battery charging level of the second rechargeable battery of the portable rechargeable device and comparing the detected battery charging level to the threshold value are periodically repeated until the threshold is reached.

16. A portable charging device for charging portable rechargeable electronic devices, the portable charging device comprising:
a rechargeable battery;
charging control circuitry for controlling a charging of at least one portable rechargeable device, comprising:
interface circuitry adapted for electrically connecting the at least one portable rechargeable device to the rechargeable battery, so as to charge the at least one portable rechargeable device from power of the rechargeable battery;
gauging circuitry adapted for:
automatically detecting a battery charging level of the connected at least one portable rechargeable device,
comparing the detected battery charging level to a threshold value, and
detecting if the threshold value has been reached; and
a processor configured for serving as a control unit connected at least to the interface circuitry and the gauging circuitry, the control unit comprising a timer,
wherein the charging control circuitry is adapted for repetitively:
performing a charging phase by transferring energy from the rechargeable battery to the at least one portable rechargeable device via the interface circuitry until the gauging circuitry indicates that the threshold value has been reached;
entering a pause phase where the charging of the at least one portable rechargeable device from the rechargeable battery is suspended, and starting the timer; and
when the timer has elapsed, returning to the charging phase; and
connection sensing means for detecting whether the at least one portable rechargeable electronic device is connected to the portable charging device, regardless of whether the portable charging device is currently in the pause phase or in the charging phase.

17. A portable charging device for charging portable rechargeable electronic devices, the portable charging device comprising:
a rechargeable battery;
charging control circuitry for controlling a charging of at least one portable rechargeable device, comprising:
interface circuitry adapted for electrically connecting the at least one portable rechargeable device to the rechargeable battery, so as to charge the at least one portable rechargeable device from power of the rechargeable battery;
gauging circuitry adapted for:
automatically detecting a battery charging level of the connected at least one portable rechargeable device,
comparing the detected battery charging level to a threshold value, and
detecting if the threshold value has been reached; and
a processor configured for serving as a control unit connected at least to the interface circuitry and the gauging circuitry, the control unit comprising a timer,
wherein the charging control circuitry is adapted for repetitively:
performing a charging phase by transferring energy from the rechargeable battery to the at least one portable rechargeable device via the interface circuitry until the gauging circuitry indicates that the threshold value has been reached;
entering a pause phase where the charging of the at least one portable rechargeable device from the rechargeable battery is suspended, and starting the timer; and
when the timer has elapsed, returning to the charging phase; and
connection sensing means enabling the at least one portable rechargeable electronic device to detect whether it is connected to the portable charging device, regardless of whether the portable charging device is currently in the pause phase or in the charging phase.

* * * * *